United States Patent
Li et al.

(10) Patent No.: US 10,611,653 B2
(45) Date of Patent: Apr. 7, 2020

(54) SYSTEM AND METHOD FOR COMBINED MICROORGANISM DEGRADATION AND AIR SPARGING-SOIL VAPOR EXTRACTION OF OIL-CONTAINING SLUDGE

(71) Applicant: Chinese Research Academy of Environmental Sciences, Beijing (CN)

(72) Inventors: Juan Li, Beijing (CN); Beidou Xi, Beijing (CN); Chuanjun Zhao, Beijing (CN); Yang Wang, Beijing (CN); Jun Tang, Beijing (CN); Jing Su, Beijing (CN); Lei Chen, Beijing (CN); Yang Yang, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 0 days.

(21) Appl. No.: 16/046,214

(22) Filed: Jul. 26, 2018

(65) Prior Publication Data
US 2019/0248687 A1 Aug. 15, 2019

(30) Foreign Application Priority Data
Feb. 11, 2018 (CN) .......................... 2018 1 0143628

(51) Int. Cl.
*C02F 1/20* (2006.01)
*C02F 3/12* (2006.01)
(Continued)

(52) U.S. Cl.
CPC .............. *C02F 3/1284* (2013.01); *B09C 1/10* (2013.01); *C02F 1/20* (2013.01); *C02F 3/22* (2013.01);
(Continued)

(58) Field of Classification Search
None
See application file for complete search history.

(56) References Cited

U.S. PATENT DOCUMENTS 3,997,434 A * 12/1976 Macauley, Jr. ......... B03B 9/063
209/10
4,036,625 A * 7/1977 Holmes .................... C03B 3/00
65/136.2
(Continued)

FOREIGN PATENT DOCUMENTS

CN 101209400 A 7/2008
CN 201427922 Y 3/2010
(Continued)

OTHER PUBLICATIONS

Office Action dated Nov. 29, 2019 issued in connection with Chinese application No. 201810143628.5.

*Primary Examiner* — Chester T Barry

(57) ABSTRACT

A system and method for combined microorganism degradation and air sparging-soil vapor extraction (AS-AVE) of oil-containing sludge can include a microorganism-adding unit, an AS-SVE unit, a metering-feeding layer, a mixing layer, a material discharging layer and a crawler-type conveyor. In some embodiments the microorganism-adding unit and the AS-SVE unit can include a microorganism storage tank and an AS-SVE storage tank. In some embodiments, the metering-feeding layer can include a valve, a pressure gauge, a flowmeter, a feeding chamber. In some embodiments, the mixing layer can include pipeline connectors and a stirrer. In some embodiments, the material discharging layer is mainly for transporting the treated soil away. The system can remove petroleum, petroleum hydrocarbons, volatile organic compounds (VOCs), and degradable and extractable contaminants from oil-containing sludge by a method combining microorganism degradation, mechanical stirring, AS-AVE and the like, thereby achieving soil remediation and automatic treatment in a large scale.

17 Claims, 1 Drawing Sheet

(51) Int. Cl.
*B09C 1/10* (2006.01)
*C02F 3/22* (2006.01)
*C02F 101/32* (2006.01)

(52) U.S. Cl.
CPC .. *C02F 2101/322* (2013.01); *C02F 2203/006* (2013.01)

(56) References Cited

U.S. PATENT DOCUMENTS

| | | | |
|---|---|---|---|
| 5,601,793 A * | 2/1997 | Fujimori | B01J 19/004 165/86 |
| 2005/0197789 A1* | 9/2005 | Niermann | G06Q 10/06 702/23 |
| 2009/0298141 A1* | 12/2009 | De Vries | B01D 17/0217 435/134 |
| 2010/0150657 A1* | 6/2010 | Ball | B09C 1/002 405/128.5 |
| 2019/0151912 A1* | 5/2019 | Ball | B09C 1/002 |

FOREIGN PATENT DOCUMENTS

| | | | |
|---|---|---|---|
| CN | 201572640 U | * | 9/2010 |
| CN | 103170498 A | | 6/2013 |
| CN | 103529190 A | | 1/2014 |
| CN | 205115249 U | | 3/2016 |
| CN | 107010754 A | | 8/2017 |

\* cited by examiner

SYSTEM AND METHOD FOR COMBINED MICROORGANISM DEGRADATION AND AIR SPARGING-SOIL VAPOR EXTRACTION OF OIL-CONTAINING SLUDGE

CROSS-REFERENCE TO RELATED APPLICATION(S)

This application claims priority to Chinese application 201810143628.5 filed on Feb. 11, 2018. The 201810143628.5 application is hereby incorporated by reference in its entirety.

FIELD OF THE INVENTION

The present disclosure relates to a combined treatment for microorganism degradation and air sparging-soil vapor extraction (AS-SVE) of oil-containing sludge. In particular the present disclosure relates to a combined system and treatment method for microorganism degradation and air sparging-soil vapor extraction of oil-containing sludge, removing petroleum, petroleum hydrocarbons, volatile organic compounds (VOCs), and degradable and extractable organic contaminants from oil-containing sludge by microorganism degradation and air sparging-soil vapor extraction after petroleum contaminants enter into the soil.

Increasing developments by petrochemical companies and applications for petroleum and gasoline in everyday life have increased the risk of crude oil dropping, storage tank or pipeline breakages, sewage leakages and the like occurring during storage and transportation. These incidents can result in oil-containing components entering into aeration zone soil and pose a great threat to the underground water environment safety. Technologies for remedying petroleum contaminated fields include physical remediation technologies such as thermal desorption, electrokinetic remediation technology and the like, chemical technologies such as leaching extraction method, photo-catalytic oxidation method, oxidation reduction method and the like, and biological technologies such as microorganism remediation technology, plant remediation technology, physics chemistry-biology combined remediation technology, and the like. Currently microorganism remediation technology is a hotspot and a focus of research in the field of biologically remedying petroleum contaminated soils. The theory of microorganism remediation is relatively systematic, and the technology is relatively mature. Some advanced processes and bacteria have been applied in practice successively.

Air sparging-soil vapor extraction (AS-SVE) recently developed remediation technology for specifically treating VOCs. SVE is a remediation technology for specifically treating VOCs that emerged in the 20th century. SVE is used in 27% of "superfund" case applications all over the USA, and it is regarded as a standard treatment method for removing VOCs in soils. However, SVE requires that the soil of the contaminated field have good permeability to be treated. When organic contaminants are treated via SVE, a "tailing" phenomenon often occurs in the late stage of remediation. This "tailing" can be effectively solved by using microorganism degradation. Microorganism degradation requires a certain amount of water, such that the water content of the sludge decreases and the sludge becomes loose, facilitating the implementation of subsequent SVE. Therefore, in treating oil-containing sludge, the microorganism remediation technology in combination with air sparging-soil vapor extraction technology can remove more kinds of petroleum contaminants and obtain soils with contaminants of a lower concentration.

SUMMARY OF THE INVENTION

In view of the above, a combined system and method for microorganism degradation and air sparging-soil vapor extraction of oil-containing sludge are disclosed, so as to at least partially solve at least one of the above technical problems.

A system for combined microorganism degradation and air sparging-soil vapor extraction of oil-containing sludge can comprise a microorganism-adding unit, an AS-SVE unit, a container for combined treatments, and a gas/liquid porous converter.

In at least some embodiments the microorganism-adding unit is used for introducing a microorganism-containing liquid into the container to degrade the oil-containing sludge with microorganism(s).

In at least some embodiments, the AS-SVE unit is used for importing a gas for air sparging into the container to air sparge the oil-containing sludge and to remove an off gas from the degraded and air sparged oil-containing sludge in the container in an extraction manner.

In at least some embodiments, the container is provided with a feed inlet, a stirrer, and a discharge outlet. In some embodiments, the stirrer is used for stirring the oil-containing sludge in the container.

In at least some embodiments, the gas/liquid porous converter is in a ring shape, is disposed in a middle of the container, and comprises openings distributed on a periphery of the ring shape and correspondingly in communication with a plurality of channels, the plurality of channels being alternatively in communication with a transport pipeline of the microorganism-adding unit and an air sparging pipeline of the AS-SVE unit respectively to transport the microorganism-containing liquid and the gas for air sparging into the container respectively.

A treatment method for oil-containing sludge can use a system for combined microorganism degradation and air sparging-soil vapor extraction of oil-containing sludge as described above. In some embodiments the method comprises the steps of:

(a) determining the number of the systems, and the diameters and heights of a microorganism storage tank and an air sparging-soil vapor extraction storage tank according to a field size, and the actual total amount of contaminants to be treated;

(b) determining materials of respective pipelines according to types of main contaminants obtained from an on-site preliminary experiment;

(c) mounting and/or adjusting the system for combined microorganism degradation and air sparging-soil vapor extraction of oil-containing sludge;

(d) determining a microorganism delivering amount, a mixing amount of the oil-containing sludge, an air sparging time and content, an extraction time and rate, a temperature and a pH parameter by experiments;

(e) determining an optimal solution by extracting gaseous contaminants and detecting its amount; and (f) treating the oil-containing sludge by using the system for combined microorganism degradation and air sparging-soil vapor extraction of oil-containing sludge.

A system for combined microorganism degradation and air sparging-soil vapor extraction of oil-containing sludge has many advantages. It can effectively degrade and remedy oil-containing sludge produced by releasing, emitting, dropping and leaking during crude oil exploitation, oil field gathering and transportation, and oil refining and processing. The system can dispose oil-containing sludge in batches by using bioremediation technology, air sparging technology and soil vapor extraction technology in combination. The combined use of various technologies effectively ensures, or at least increase, the remediation of oil-containing sludge.

In at least some embodiments, a system for combined microorganism degradation and air sparging-soil vapor extraction of oil-containing sludge can remove petroleum, petroleum hydrocarbons, volatile organic compounds (VOCs), and degradable and extractable contaminants from oil-containing sludge by a combined method such as microorganism degradation, mechanical stirring, air sparging-soil vapor extraction and/or the like, thereby achieving objects of soil remediation and scaled automatic treatments.

DETAILED DESCRIPTION OF ILLUSTRATIVE EMBODIMENT(S)

In order to describe the objects, technical solutions and advantages of the present disclosure, the details are disclosed below in combination with particular embodiments and with reference to the drawings.

Figure 1:
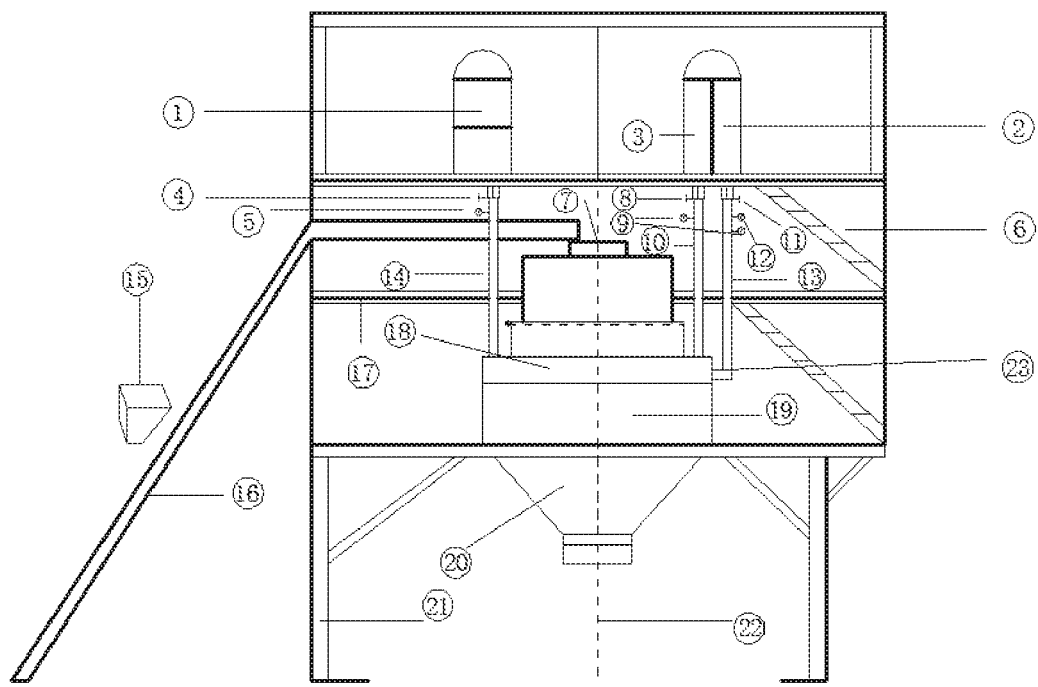
FIG. 1 is a side cross-sectional view of a system for a combined microorganism degradation and air sparging-soil vapor extraction of oil-containing sludge.

FIG. 1 shows a system for a combined microorganism degradation and air sparging-soil vapor extraction of oil-containing sludge comprising microorganism storage tank 1, extraction chamber 2, air sparging chamber 3, liquid stop valve 4, liquid flowmeter 5, staircase 6, feed bin 7, gas check valve 8, gas flowmeter 9, air sparging pipeline 10, gas valve 11, pressure gauge 12, extraction pipeline 13, agent transport pipe 14, material transport hopper 15, crawler-type conveyor 16, interlayer 17, pipeline connector 18, stirrer 19, material discharging bin 20, truss-type pillar 21, vehicle loading bay or travelling room 22, and extraction hole 23.

Figure 2:
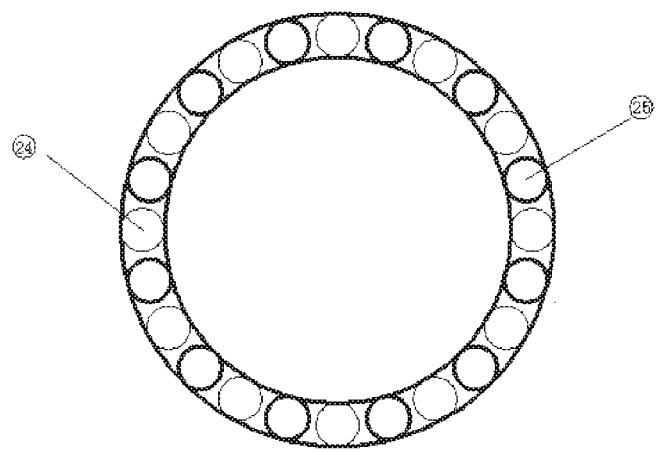
FIG. 2 is a top cross-sectional view of holes of the pipeline connectors.

FIG. 2 illustrates a top cross-sectional view of a pipeline connector showing agent injection hole 24 and air sparging hole 25.

A system for combined microorganism degradation and air sparging-soil vapor extraction of oil-containing sludge can comprise a microorganism-adding unit, an AS-SVE unit, a container for combined treatments, and a gas/liquid porous converter.

In at least some embodiments, the microorganism-adding unit is used for introducing a microorganism-containing liquid into the container to degrade the oil-containing sludge with microorganisms.

In at least some embodiments, the AS-SVE unit is used for importing a gas for air sparging into the container to air sparge the oil-containing sludge and to remove an off gas in the degraded and air sparged oil-containing sludge in the container in an extraction manner.

In at least some embodiments, the container is provided with a feed inlet, a stirrer, and a discharge outlet. In at least some embodiments the stirrer is used for stirring the oil-containing sludge in the container.

In at least some embodiments, the gas/liquid porous converter is in a ring shape, disposed in a middle of the container, and comprises openings distributed on a periphery of the ring shape and correspondingly in communication with a plurality of channels. In some embodiments, the plurality of channels is alternatively in communication with a transport pipeline of the microorganism-adding unit and an air sparging pipeline of the AS-SVE unit respectively to transport the microorganism-containing liquid and the gas for air sparging into the container respectively.

In some embodiments, components of the system for combined microorganism degradation and air sparging-soil vapor extraction of oil-containing sludge are disposed in layers from top to bottom as follows:

a microorganism-AS-SVE unit layer comprising the microorganism-adding unit and the AS-SVE unit is positioned in a top layer of the system for combined microorganism degradation and air sparging-soil vapor extraction of oil-containing sludge;

a metering-feeding layer comprises the feed inlet of the container, the transport pipeline of the microorganism-adding unit, the air sparging pipeline of the AS-SVE unit, and a metering unit disposed in an internal space of the container;

a mixing layer comprises the stirrer and the gas/liquid porous converter disposed on the container; and a material discharging layer comprises the discharge outlet of the container.

In some embodiments, a sampling unit is mounted on an extraction pipeline of the AS-SVE unit to indirectly determine a removal effect of soil contaminants.

In some embodiments, an air sparging chamber and an extraction chamber of the AS-SVE unit are disposed in one receptacle and separated from each other by a separating plate.

In some embodiments, a position at which an extraction pipeline of the AS-SVE unit connects to an internal space of the container is located on a top of the gas/liquid porous converter to facilitate removal of an off gas from the degraded and air sparged oil-containing sludge.

In some embodiments, a crawler, a closed feeding box, and a full-automatically stirring and full-automatically discharging unit are utilized for feeding.

In some embodiments, the feed inlet of the container is disposed in the vehicle travelling room. In some embodiments, the feed inlet is capable of directly transport a discharged material into a carriage of a truck in a self-discharging manner.

In some embodiments, a ring-shaped design is utilized at a connecting position between the stirrer and a feed bin. In some embodiments, holes are evenly distributed thereon with apertures matched with the transport pipeline, microorganism and air sparging pipelines are disposed alternatively, and diameters and materials of the pipelines are determined depending on a field scale and types of contaminants.

A treatment method for oil-containing sludge using an embodiment of the system for combined microorganism degradation and air sparging-soil vapor extraction of oil-containing sludge as described above can comprises the following steps:

(a) determining the number of the systems, and the diameters and heights of a microorganism storage tank and an air sparging-soil vapor extraction storage tank according to a field size and an actual total amount of contaminants to be treated;

(b) determining materials of respective pipelines according to types of main contaminants obtained from an on-site preliminary experiment;

(c) mounting and/or adjusting the system for combined microorganism degradation and air sparging-soil vapor extraction of oil-containing sludge;

(d) determining a microorganism delivering amount, a mixing amount of the oil-containing sludge, an air sparging time and content, an extraction time and rate, a temperature and a pH parameter by experiments;

(e) determining an optimal solution through the detected content of contaminants in the extracted gas; and (f) treating the oil-containing sludge by using the system for combined microorganism degradation and air sparging-soil vapor extraction of oil-containing sludge.

In some embodiments, in the step of treating the oil-containing sludge by using the system for combined microorganism degradation and air sparging-soil vapor extraction of oil-containing sludge, a microorganism degradation is first performed, then an air sparging is performed, subsequently an off gas is removed by extraction, and then it is detected whether to repeat the above steps.

In one preferable embodiment, a system for combined microorganism degradation and air sparging-soil vapor extraction of oil-containing sludge comprese a microorganism-AS-SVE unit layer, a metering-feeding layer, a mixing layer, a material discharging layer, and a crawler-type conveyor, wherein the microorganism-adding unit and the AS-SVE unit are used in combination, and the volatile contaminants can be degraded with microorganisms and subjected to air sparging-soil vapor extraction, such that the range of contaminants to be treated is wider.

In some embodiments, the system for combined microorganism degradation and aeration-extraction of oil-containing sludge is mounted on the gas/liquid porous converter in the middle of the stirrer and a material storage bin; the exterior of this converter is connected to the microorganism-adding unit and the AS-SVE unit respectively with a single channel and the interior thereof is composed of a plurality of channels distributed alternatively on the annular wall, such that the converter can split the transported microorganism-containing liquid and gas; further, with the mechanical stirring of the stirrer, a more sufficient and uniform mixing of the materials and agent can be achieved.

In some embodiments, the air sparing-extraction treatment unit is divided into an air sparging chamber on the first side and an extraction chamber on the second side, wherein the air sparging chamber determines the ratio of gaseous components from the treatment of the petroleum components contained, the gas temperature and content according to the outdoor conditions, and the optimal temperature for the microorganism degradation. In some embodiments, the extraction pipeline is connected to the gas/liquid porous converter at the external top, facilitating the removal of off gas in the degraded and air sparged soil.

In some embodiments of a system for combined microorganism degradation and air sparging-soil vapor extraction of oil-containing sludge, metering units are mounted on a connecting pipeline of the microorganism unit, the air sparging unit and the material storage bin respectively to determine the optimal mixing ratio. In some embodiments, a sampling unit is mounted on an extraction pipeline to indirectly determine a removal effect of soil contaminants.

In some embodiments of a system for combined microorganism degradation and air sparging-soil vapor extraction of oil-containing sludge, a crawler, a closed feeding box are utilized for its feeding, and a full-automatically stirring and full-automatically discharging unit are used to save manpower.

In at least some embodiments, the mixing layer mainly has respective pipeline connectors and a stirrer; and the material discharging layer is mainly for transporting the treated soil away from the system with a truck.

In some embodiments of a system for combined microorganism degradation and air sparging-soil vapor extraction of oil-containing sludge, the system can remove petroleum, petroleum hydrocarbons, volatile organic compounds (VOCs), and degradable and extractable contaminants from oil-containing sludge by a combined method such as microorganism degradation, mechanical stirring, air sparging-soil vapor extraction and the like, thereby achieving objects of soil remediation and scale automatic treatment.

As shown in FIG. 1, a system for combined microorganism degradation and air sparging-soil vapor extraction of oil-containing sludge, can comprise a microorganism-AS-SVE unit layer, a metering-feeding layer, a mixing layer, a material discharging layer, and a crawler-type conveyor.

In at least some embodiments, the microorganism-AS-SVE unit layer is designed to be in a top layer, with a separating wall therebetween for blocking, wherein microorganism storage tank 1 is mounted on the left side and can be joined together in segments; and the AS-SVE unit is divided into extraction chamber 2 and air sparging chamber 3.

A second layer of the system is a metering-feeding layer, wherein microorganism storage tank 1 is connected to pipeline connector 18 through agent transport pipe 14. Liquid stop valve 4 and liquid flowmeter 5 are mounted on agent transport pipe 14. In some embodiments, such as the one shown in FIG. 1, air sparging chamber 3 is connected to pipeline connector 18 through air sparing pipeline 10, on which gas flowmeter 9 and gas check valve 8 are mounted. In some embodiments, such as the one shown in FIG. 1, extraction chamber 2 is connected to pipeline connector 18 through extraction pipeline 13, on which gas valve 11, gas flowmeter 9 and pressure gauge 12 are mounted. In some embodiments, pipeline connector 18 has extraction 23, agent injection hole 24 and air sparging hole 25 respectively. In some embodiments, feed bin 7 is also provided in this layer, and uses crawler-type conveyor 16 to lift material transport hopper 15 containing sludge to a feed inlet.

A third layer of the system is a mixing layer, wherein pipeline connector 18 is connected to respective upper pipelines, and the mixing of the materials and agents is performed by stirrer 19.

The bottom layer is a vehicle travelling layer, wherein mixer 19 has self-material discharging bin 20, a transporting truck can enter vehicle loading bay or travelling room 22, and the load-bearing can be ensured by truss-type pillar 21.

In at least some embodiments, during use of a system for combined microorganism degradation and air sparging-soil vapor extraction of oil-containing sludge, (a) the number of the systems, and diameters and heights of a microorganism storage tank and an air sparging-soil vapor extraction storage tank are determined according to a field size and an actual total amount of contaminants to be treated; and materials of respective pipelines are determined according to types of main contaminants obtained from an on-site preliminary experiment;

(b) a microorganism-AS-SVE unit layer, a metering-feeding layer, a mixing layer, a material discharging layer, and a crawler-type conveyor are sequentially mounted in order;

(c) the determination of a microorganism delivering amount, a mixing amount of the oil-containing sludge, an air sparging time and content, an extraction time and rate, a temperature and a pH parameter required in early stage of experiments, and an optimal solution can be determined through the detected content of contaminants in the extracted gas.

The objects, technical solutions and advantageous effects of the present disclosure are described in detail in the above particular embodiments. It should be understood that the above descriptions are only some particular embodiments of the present disclosure but are not to limit the present application. Any variations, equivalents, modifications and the like made within the spirit and principle of the present application should be covered by the present application.

While particular elements, embodiments and applications of the present invention have been shown and described, it will be understood, that the invention is not limited thereto since modifications can be made without departing from the scope of the present disclosure, particularly in the light of the foregoing teachings.

What is claimed is:

1. A system for combined microorganism degradation and air sparging-soil vapor extraction (AS-SVE) of an oil-containing sludge comprising:
    (a) a microorganism-adding unit;
    (b) an AS-SVE unit;
    (c) a container for combined treatments comprising
        (i) a feed inlet;
        (ii) a stirrer; and
        (iii) discharge outlet;
    (d) a gas/liquid porous converter;
    wherein said microorganism-adding unit is used for introducing a microorganism-containing liquid into said container to degrade said oil-containing sludge with a microorganism,
    wherein said AS-SVE unit is used for introducing a gas for air sparging into said container to air sparge said oil-containing sludge and to remove an off gas from said oil-containing sludge in the container in an extraction manner,
    wherein said stirrer is used for stirring said oil-containing sludge in said container, and
    wherein said gas/liquid porous converter is annular and is disposed in a middle of said container, and comprises a plurality of peripherally distributed openings in communication with a plurality of channels, said plurality of channels being alternatively in communication with a transport pipeline of said microorganism-adding unit and an air sparging pipeline of said AS-SVE unit respectively, so as to introduce said microorganism-containing liquid and said gas for air sparging into said container respectively.

2. The system according to claim 1, wherein said system comprises the following multiple layers from top to bottom:
    (A) a microorganism-AS-SVE unit layer comprising
        (i) said microorganism-adding unit; and
        (ii) said AS-SVE unit, positioned in a top layer of the system;
    (B) a metering-feeding layer comprising
        (i) said feed inlet of said container;
        (ii) said transport pipeline of said microorganism-adding unit;
        (iii) said air sparging pipeline of said AS-SVE unit; and
        (iv) a metering unit disposed within said container;
    (C) a mixing layer comprising
        (i) said stirrer; and
        (ii) said gas/liquid porous converter disposed on the container; and
    (D) a material discharging layer comprising
        (i) the discharge outlet of the container.

3. The system according to claim 2, wherein a sampling unit is configured on an extraction pipeline of the AS-SVE unit to indirectly determine a removal effect of soil contaminants.

4. The system according to claim 1, wherein said AS-SVE unit comprises an air sparging chamber and an extraction chamber disposed in one receptacle and separated from each other with a separating plate.

5. The system according to claim 1, wherein said AS-SVE unit comprises an extraction pipeline connected to the container, wherein said connected region is above the gas/liquid porous converter, so as to facilitate a removal of an off gas from said oil-containing sludge.

6. The system according to claim 1, wherein said system further comprises:
    (e) a crawler;
    (f) a closed feeding box used for feeding
    (g) an automatic stirrer; and
    (h) an automatic discharging unit.

7. The system according to claim 1, wherein said discharge outlet of said container is disposed in a vehicle travelling room, capable of directly self-discharging a material into a vehicle.

8. The system according to claim 1, wherein said gas/liquid porous converter is annular and configured at a connection region between said stirrer and a feed bin of the container, wherein said gas/liquid porous converter comprises a plurality of holes evenly distributed thereon, and the sizes of said holes are matched with said transport pipeline, wherein said transport pipeline of said microorganism-adding unit and said air-sparging pipelines are disposed alternatively, and wherein a diameter and a material of said transport pipeline and said air-sparging pipeline are determined according to a field scale and types of a plurality of contaminants.

9. A method for treating an oil-containing sludge using said system according to claim 1, comprising the following steps:
    (a) determining a number of said systems, a diameter and a height of a microorganism storage tank of said microorganism-adding unit and a storage tank of said AS-SVE unit according to a field size and an actual total amount of a plurality of contaminants to be treated;
    (b) determining a plurality of materials of said transport pipeline and said air-sparging pipeline according to types of a plurality of main contaminants obtained from an on-site preliminary experiment;
    (c) mounting and/or adjusting said system for combined microorganism degradation and air sparging-soil vapor extraction of oil-containing sludge;
    (d) determining an amount of microorganism(s) to be added, a mixing amount of said oil-containing sludge, an air sparging time and content, an extraction time and rate, a temperature and a pH parameter by a plurality of experiments;
    (e) determining an optimal solution through detecting a plurality of contaminant contents in an extracted gas; and
    (f) treating said oil-containing sludge by using said system for combined microorganism degradation and air sparging-soil vapor extraction of oil-containing sludge.

10. A method for treating an oil-containing sludge using said system according to claim 2, comprising the following steps:
    (a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments;
(e) determining an optimal solution through detecting a plurality of contaminant contents in extracted gas; and
(f) treating said oil-containing sludge by using said system for combined microorganism degradation and air sparging-soil vapor extraction of oil-containing sludge.

11. A method for treating an oil-containing sludge using said system according to claim 3, comprising the following steps:
(a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments;
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

12. A method for treating an oil-containing sludge using the system according to claim 4, comprising the following steps:
(a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments:
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

13. A method for treating an oil-containing sludge using said system according to claim 5, comprising the following steps:
(a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter a by a plurality of experiments;
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

14. A method for treating an oil-containing sludge using said system according to claim 6, comprising the following steps:
(a) determining a number of the systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments;
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

15. A method for treating said oil-containing sludge using said system according to claim 7, comprising the following steps:

(a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments;
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

16. A method for treating an oil-containing sludge using said system according to claim 8, comprising the following steps:
(a) determining a number of said systems, a diameter and a height of a microorganism storage tank of said microorganism-adding unit and a storage tank of said AS-SVE unit according to a field size and an actual total amount of a plurality of contaminants to be treated;
(b) determining a plurality of materials of said transport pipeline and said air-sparging pipeline according to types of a plurality of main contaminants obtained from an on-site preliminary experiment;
(c) mounting and/or adjusting said system for combined microorganism degradation and air sparging-soil vapor extraction of oil-containing sludge;
(d) determining an amount of microorganism(s) to be added, a mixing amount of said oil-containing sludge, an air sparging time and content, an extraction time and rate, a temperature and a pH parameter by a plurality of experiments;
(e) determining an optimal solution through detecting a plurality of contaminant contents in an extracted gas; and
(f) treating said oil-containing sludge by using said system for combined microorganism degradation and air sparging-soil vapor extraction of oil-containing sludge.

17. The method according to claim 9, wherein in said step of treating said oil-containing sludge by using said system for combined microorganism degradation and air sparging-soil vapor extraction of oil-containing sludge, first carrying out a microorganism degradation, then carrying out an air sparging, subsequently removing an off gas by extraction, and carrying out a detection to determine whether to repeat said above steps.

\* \* \* \* \*